United States Patent Office 2,767,063
Patented Oct. 16, 1956

2,767,063
METHODS OF SILVER DETERMINATION

William E. Chesney, Baltimore, Md., assignor to Salem-Brosius, Inc., Pittsburgh, Pa., a corporation of Pennsylvania No Drawing. Application May 25, 1954,
Serial No. 432,305

3 Claims. (Cl. 23—230)

This invention relates to a method of silver determination and particularly to a method of determining very small amounts of silver such as are used in water purification. It has long been known to use small amounts of silver in water purification for its germicidal or preservative effects. Many attempts have been made to apply the germicidal properties of silver to the disinfection of drinking waters. However, the determination of the amount of silver present has always been extremely difficult and unsatisfactory. As a result purification of water by the addition of silver thereto has not met with favor and has been generally avoided.

I have discovered a method of determining the amount of silver in water where the silver appears in very small amounts such as are used in water purification. The method of my invention is convenient to use, is quickly carried out and is extremely accurate. Preferably I compound the silver present in the aqueous solution to form an insoluble compound, collect the insoluble silver compound from the solution and measure the amount formed to ascertain the original concentration of silver. Preferably the silver is compounded into silver iodide which is in turn removed from the solution through a membrane filter of small circular area. The silver is then preferably converted to silver sulphide which forms a dark-colored disc on the membrane. The resulting discoloration is compared to that produced by known concentrations of silver.

In the preferred practice of my invention silver determinations are made according to the following example. A series of silver solutions are prepared with silver nitrate and prefiltered distilled water. A series appropriate for the determination of silver in water would be as follows: 0.10 p. p. m., 0.050 p. p. m., 0.04 p. p. m., 0.03 p. p. m., 0.02 p. p. m. and 0.01 p. p. m. silver. For each silver concentration 100 milliliters of solution are prepared. Each solution is then acidulated with 10 drops of dilute hydrochloric acid (1 part of concentrated hydrochloric acid with 1 part of distilled water), 2 to 3 drops of potassium iodide reagent (1 part of potassium iodide with 10 parts of distilled water and 1 drop of Lugols iodine solution/50 ml. of KI solution). The solution is then passed through a Lovell Millipore filter (type HA-plain) covered by a circular Lucite shield having a circular orifice 1 square centimeter in area. The collected silver iodide in the 1 square centimeter area is treated with several milliliters of sodium sulphide solution (distilled H₂O with 5 p. p. m. sulphide) to convert the silver iodide to silver sulphide. The sulphide is washed with several milliliters of distilled water to remove the excess sulphide. This procedure is followed for each of the silver standards to make up a standard disc. A 500 milliliter sample of the unknown water to be analyzed is filtered into a membrane filter to remove colloidal and extraneous matter. The sample is then treated with 50 drops (about 2.5 milliliters) of the hydrochloric acid solution above mentioned followed by 10 drops of the potassium iodide reagent. The resulting solution is then passed through a membrane filter (the Lovell Millipore filter mentioned above) with the Lucite shield in place in the same way as the standard solutions. About 2 milliliters of the sulphide solution is added to the silver iodide to form silver sulphide. The resulting colored disc of silver sulphide on the membrane is compared with the silver standards and the corresponding value of silver is obtained for the unknown water sample.

Other sulphides and sulphur-containing materials capable of releasing hydrogen sulphide or mild acidification may be used in place of sodium sulphide solutoin. For example, thioglycolate salts, thioglycolic acid, and similar materials as well as the better known inorganic sulphides may be used.

While I have described a preferred practice of my invention it may be otherwise practiced within the scope of the following claims.

I claim:

1. A method of determining small amounts of silver in water comprising the steps of converting the silver to insoluble silver iodide, filtering the resulting silver iodide on a restricted fixed area of membrane filter, converting the insoluble silver iodide on the filter to sulphide and comparing the resulting silver sulphide area with a like area of a series of silver standards prepared in the same way.

2. A method of determining small amounts of silver in water comprising the steps of selecting a portion of the water to be tested, converting the silver in said portion to insoluble silver iodide by the addition of potassium iodide, filtering the resulting silver iodide on a fixed area of membrane, converting the insoluble silver iodide on the filter to sulphide by the addition of sodium sulphide solution and comparing the resulting silver sulphide area with a series of like areas produced from silver standard solutions treated in the same way.

3. The method of determining small amounts of silver in water comprising the steps of selecting a portion of the water to be tested, acidifying said portion of water with hydrochloric acid, converting the silver in said portion to insoluble silver iodide, filtering the resulting silver on a fixed area of membrane, converting the resulting silver iodide on the filter membrane to sulphide, and comparing the resulting silver sulphide area with a series of like areas produced from silver standard solutions treated in the same way and having silver contents on both sides of the expected silver content of the water being tested.

References Cited in the file of this patent

Fritz-Ephraim: "Inorganic-Chemistry," 4th edition, Nordeman Publishing Company, 1943, pages 529, 533.

Mellor: "Comprehensive Treatise on Inorganic and Theoretical Chemistry," volume 3, Longmans Green and Co., 1923, pages 392, 396, 426, 427, 432.

Mellor: "Modern Inorganic Chemistry," revised edition, 1951, Longmans Green and Company, pages 692, 630.